July 21, 1964 A. B. BARTON 3,141,702
MOBILE SAW FOR PAVEMENT AND THE LIKE
Filed April 30, 1962 4 Sheets-Sheet 2

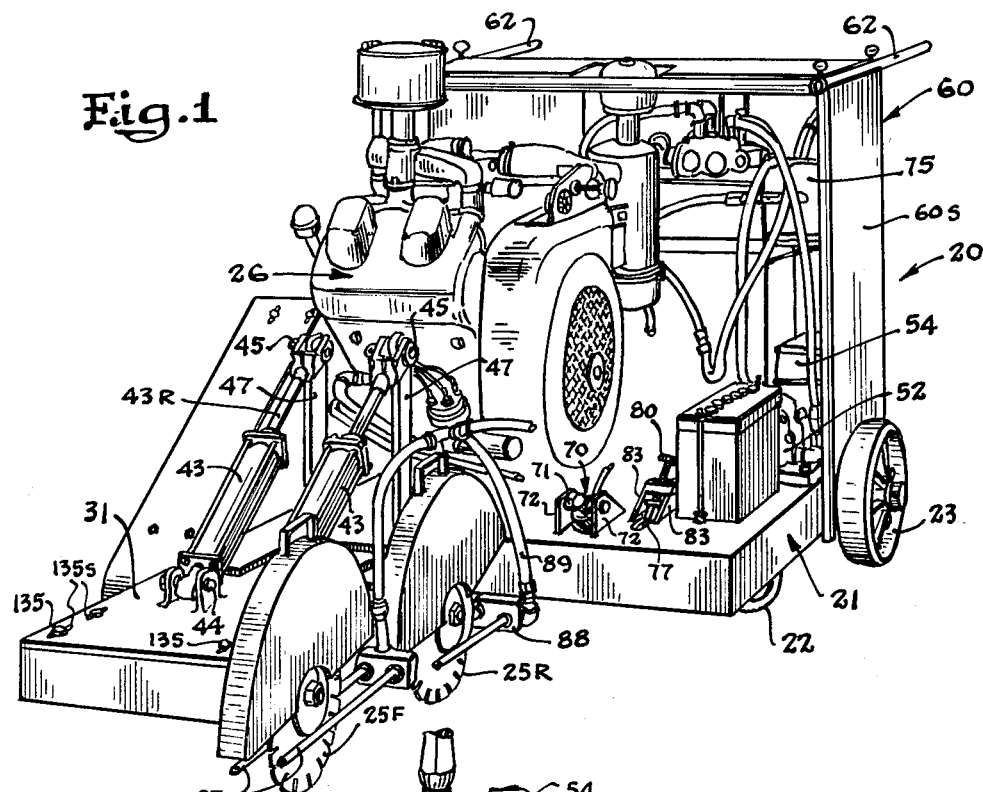
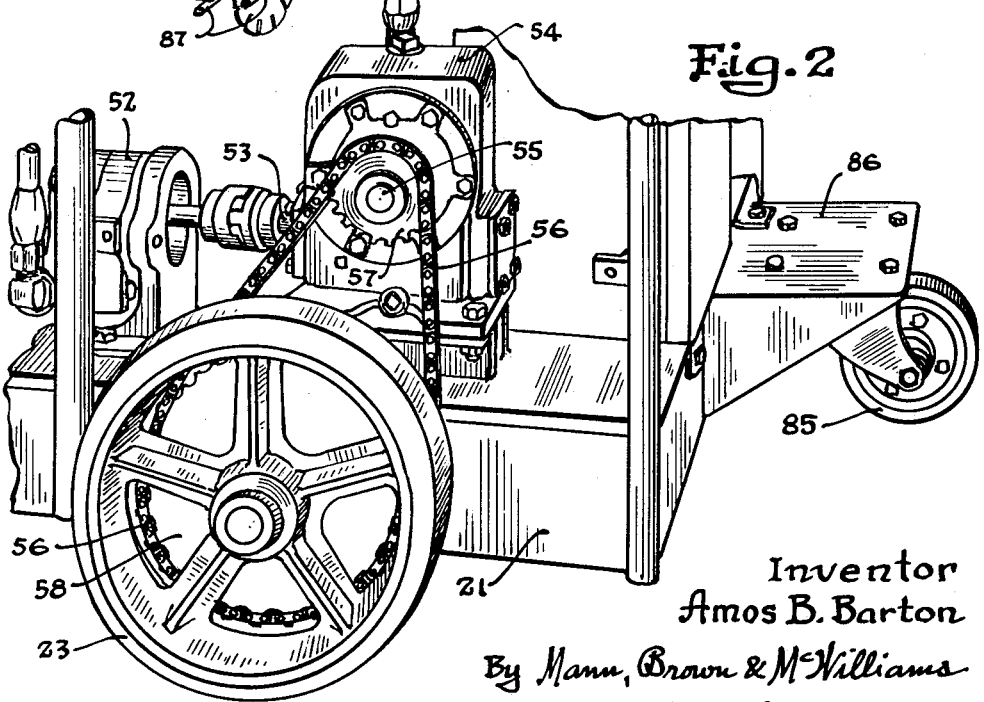

Inventor
Amos B. Barton
By Mann, Brown & McWilliams
Attorneys

July 21, 1964     A. B. BARTON     3,141,702
MOBILE SAW FOR PAVEMENT AND THE LIKE
Filed April 30, 1962     4 Sheets-Sheet 3

Inventor
Amos B. Barton
By Mann, Brown & McWilliams
Attorneys

July 21, 1964  A. B. BARTON  3,141,702
MOBILE SAW FOR PAVEMENT AND THE LIKE
Filed April 30, 1962  4 Sheets-Sheet 4

Inventor
Amos B. Barton
By Mann, Brown & McWilliams
Attorneys

United States Patent Office 3,141,702
Patented July 21, 1964

3,141,702
MOBILE SAW FOR PAVEMENT AND THE LIKE
Amos B. Barton, Normal, Ill.
Filed Apr. 30, 1962, Ser. No. 190,892
5 Claims. (Cl. 299—39)

This invention relates to mobile kerf forming apparatus for sawing kerfs in concrete pavement slabs or the like, and particularly to such apparatus that is intended primarily for sawing kerfs longitudinally or along the center line of pavement slabs.

The primary object of this invention is to provide a mobile sawing apparatus that may be quickly and easily manipulated as to changes or adjustments of direction as well as to shifting the sawing means between operating and retracted positions.

More specifically it is an object of this invention to simplify the operation and use of sawing machines of the aforesaid character, to provide for caster-type support when the machine is to be shifted to a different sawing course, to provide for power actuated forward movement of the machine, and to positively interrelate such power drive with the caster support so that the power drive is ineffective when the caster support is effective, and to accomplish the foregoing in a simple and economical manner.

In the use of saws of the aforesaid character it is usually considered to be desirable to form the kerf in the pavement slab in two steps through the use of two saws disposed in a common plane but disposed at different vertical locations so that the leading saw cuts the kerf to about half the desired depth and the second or trailing saw completes the sawing of the kerf to the desired depth. Prior machines of the aforesaid character have required rather elaborate and expensive structures for supporting, relatively adjusting, raising and lowering, and driving the two saws, and another important object of this invention is to simplify the structures of such two saw machines, and objects related to the foregoing are to provide an improved mounting and drive for the two saws, to enable relative depth of adjustment of the two saws to be attained in a simple manner and to be maintained as the two saws are shifted between their lower operating or sawing positions and their raised or non-operating positions.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a front perspective view of a mobile sawing apparatus embodying the features of the invention;

FIG. 2 is a fragmentary rear perspective of the machine showing the power drive means for the rear wheels;

Figure 3:
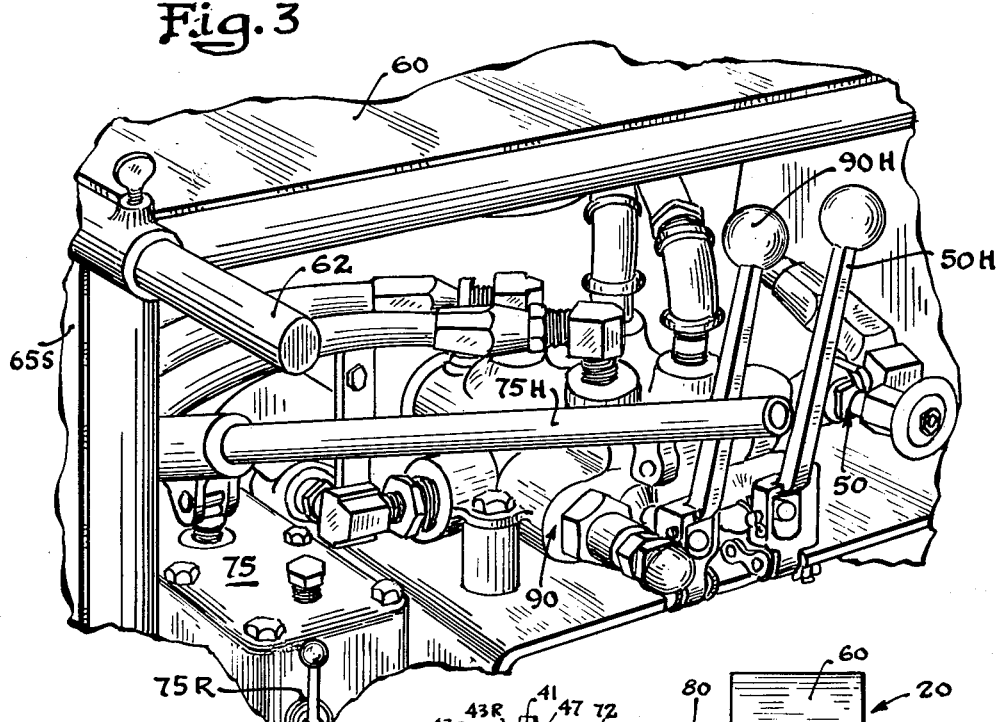
FIG. 3 is a fragmentary rear perspective of the machine showing the various control means.

For purposes of disclosure the invention is herein illustrated as embodied in a mobile sawing machine 20 a main body or platform 21, supported relatively close to the ground by pairs of front and rear wheels 22 and 23, has a pair of circular saws 25F and 25R disposed substantially centrally in front of the platform one behind the other for relative vertical adjustment in a common vertical plane, and on the platform 21 an internal combustion engine 26 is carried that drives the saws 25F and 25R as well as other mechanisms of the machine.

The main platform 21 comprises a rigid generally rectangular floor plate 21P having down turned side and front and rear flanges 21F, and at its front edge, substantially within the right hand half of the front edge as viewed from the rear, the main platform 21 has a forwardly extending saw-supporting extension 121. The extension 121 is recessed rearwardly midway between its side edges to define a forwardly opening clearance space 27 having a pair of rigid laterally spaced arms 121S and 121C at its opposite sides. The arms 121S and 121C and the extension 121 have top walls that constitute extensions of the top surface of the platform 21, and downward flanges 121F thereon provide for rigidity in these structures.

The rigid arms 121S and 121C serve as the primary supporting means for both of the saws 25R and 25F, the rear saw 25R being carried on a horizontal rear saw arbor 28R that extends through the two arms and across the clearance space 27, and the forward saw 25F being carried by a horizontal front saw arbor 28F that is mounted in an adjustable forward or secondary platform 31. The forward platform 31 is generally rectangular in plan form and midway along its rear edge it has a rearward extension 31E of a width somewhat less than the width of the recess 27 of the main platform 21. The edges of the forward platform 31 have downturned flanges 31F thereon to provide rigidity, and the rearward extension 31E provides a hollow mounting tongue whereby the forward platform 31 is pivoted on the rear saw arbor 28R as will be described.

Thus, it will be noted that the flanges 21F of the arms 121C and 125S and the flanges 31F of the rearward extension 31E have upwardly extended notches 32 cut therein through which the arbor 28R extends. Within the extension 31E a pair of pillow blocks 33 are bolted to the top wall of the extension to provide spaced bearings on the forward platform 31 for the arbor 28R, while similar pillow blocks 34 are bolted in position within the respective arms 121S and 121C to provide bearings for the arbor 28R on the main platform 21. The forward platform 31 is thus pivotally related to the main platform 31 and is set in different adjusted relationship by means that will be described hereinafter.

Figure 7:
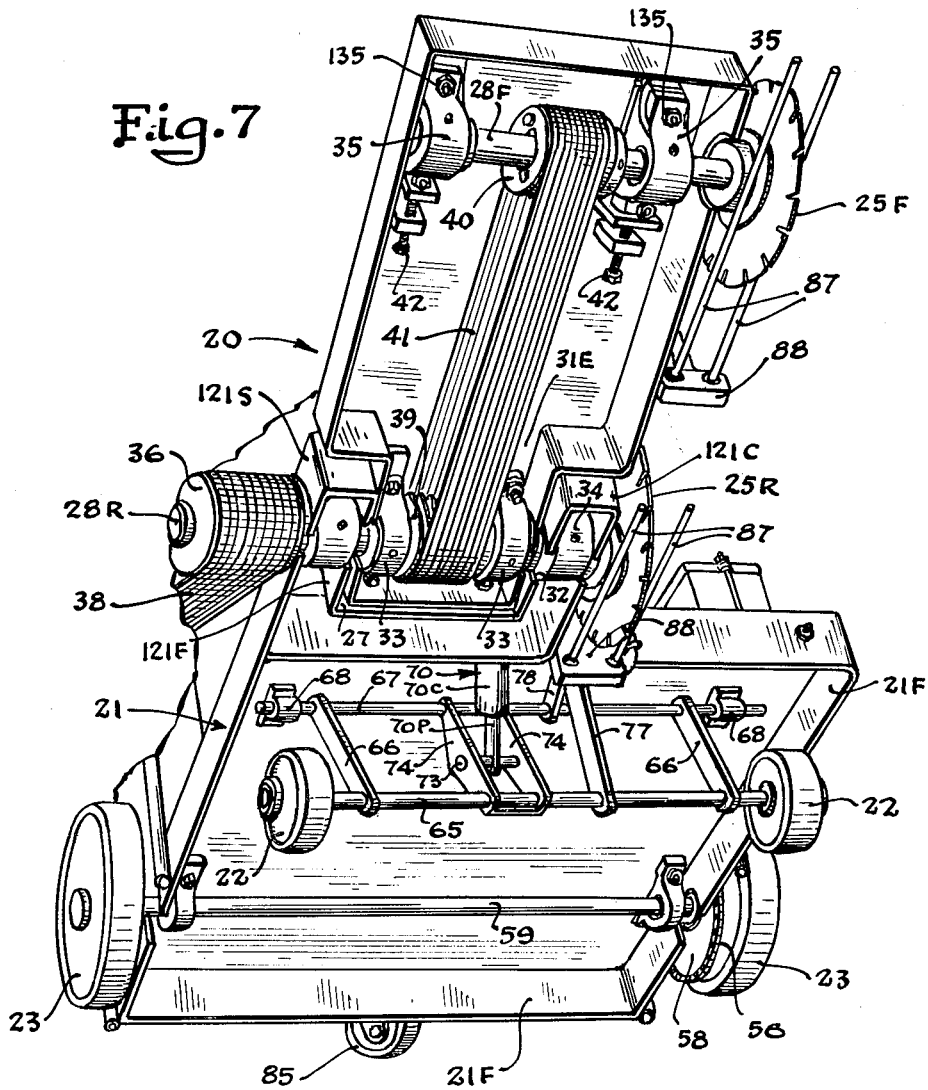
FIG. 7 is a bottom perspective view showing details of the supporting wheel structures and the driving and supporting means for the saws.

The forward arbor 28F is disposed parallel to the arbor 28R and is similarly supported by spaced pillow blocks 35 near the forward end of the forward platform 31, the right hand end of the arbor 28F, FIG. 7, projecting through a clearance notch 132 formed in the flange 31F of the forward platform. The arbors 28R and 28F have convential saw mounting means on their projecting right hand ends, as viewed in FIG. 7, so that the saws 25R and 25F may be removably secured thereon in a common vertical plane near the centerline of the machine 20.

The rear saw arbor 28R has a multiple groove pulley 36 fixed on its other projecting end, and the engine 26 is so positioned that a similar pulley 37 fixed on one projecting end of its power output shaft 26P is aligned with the pulley 36 so that the pulleys 36 and 37 may be connected by a group of belts 38. In the completed machine a guard 38G covers the belts 38 and the pulley 36 and 37. The rear saw arbor 28R has a multiple groove pulley 39 fixed thereon between the pillow blocks 33, and in an aligned relation the forward saw arbor 28F has a similar pulley 40 fixed thereon so that a group of belts 41 may drive the forward arbor 28F. The arbor 28F may be adjusted by threaded adjusting members 42 that act against the pillow blocks 35 for tightening the belts 28F and properly locating the arbor 28F in parallel relation to the arbor 28R. To facilitate this adjustment the pillow blocks 35 are secured to the forward platform by bolts 135, FIG. 1, that extend through slots 135S which are elongated in a front to rear direction with respect to the platform 31.

The forward platform 31 projects forwardly from the main platform and to raise and lower the saw 25F with relation to the rear saw 25R, the forward platform 31 is adjusted to different angular relationships. This is accomplished by hydraulic means, and as herein shown, a pair of double acting piston and cylinder units 43 are employed. The units 43 have the closed ends of their cylinders 43C pivoted on aligned transverse axes 44 to the top of the forward platform 31 substantially forwardly of the saw arbor 28R, and the units 43 extend upwardly and rearwardly in parallel spaced relation, and have their piston rods 43R pivoted on aligned axes 45 that are provided at the upper ends of a pair of rigid standards 47 that extend upwardly from the main platform 21.

A hydraulic power unit 48 is mounted on the main platform 21 and has its pump driven by a belt connection 49 from the other end of the power output shaft 26P of the engine 26. Hydraulic liquid under pressure is supplied to opposite ends of the cylinders 43C from the hydraulic power unit 48, this being accomplished under control of a control valve 50. Corresponding ends of the cylinders 43C are connected in parallel to the valve so that the units 43 raise and lower the forward platform 31 and maintain it in its adjusted relation. The valve 50 and its connections will be described in further detail hereinafter.

The hydraulic power unit 48 is also utilized to operate the drive wheels 23, and for this purpose a hydraulic rotary motor 52 is mounted on the main platform 21 so as to drive the input shaft 53 of a speed reducer 54. The reducer 54 has its output shaft 55 located above and parallel to the axis of the rear wheels 23 so that a drive chain 56 may extend downwardly from a sprocket 58 fixed on an axle 59 upon which the wheels 23 are keyed. The hydraulic motor 52, the speed reducer 54 and the chain drive connection to the wheels 23 are disposed in a protected relation inside of a removable side plate 60S of an upstanding enclosure 60 that is rigid in character and located on and entirely across the rear end portions of the main platform 21. The rigid enclosure 60 serves as a housing and mount for the valve 50 and other hydraulic control elements, as shown in FIG. 3, and in addition, a pair of handle bars 62 extend rearwardly in an adjustable relation from the upper side corners of the enclosure 60 so that an operator walking behind the machine 20 may grasp the handle bars 62 to guide and manipulate the machine.

The axle 59 is rotatably supported on the under side of the main platform by a pair of pillow blocks 63 bolted to the platform, and the ends of the axle 59 extend through slots 64 in the flanges 21F so that the drive wheels 23 are located outside of the side edges of the main platform.

The front wheels 22 are rotatably mounted on opposite ends of a front axle 65, the axle 65 being of such a length that the wheels 22 are located beneath the platform 21 but relatively close to the flanges 21F, and the axle 65 is so related to the platform 21 that the wheels 22 may be raised and lowered with respect to the platform 21, thus to adjust the vertical position of saws 25F and 25R. Thus, the front axle 65 is mounted in the forward ends of a pair of laterally spaced bars or links 66, and these links 66 extend upwardly and rearwardly and are pivoted on a transverse shaft 67 that is supported beneath the platform 21 parallel to the rear axle 59 by pillow blocks 68. The front axle 65 may be forced downwardly when the front end of the main platform is to be raised, and this is accomplished by means including a single acting hydraulic piston and cylinder unit 70. The unit 70 has the closed end of its cylinder 70C pivoted on a transverse axis 71 provided a substantial distance above the front portion of the platform 21 by a pair of spaced upstanding rigid plates 72 secured to the platform 21. The unit 70 is located opposite the midpoint of the axle 65, and extends downwardly, and slightly rearwardly through an opening in the platform 21, and beneath the platform 21 the end of the piston rod 70R is pivoted on a transverse axis 73 between the two spaced plates 74. The plates 74 extend between and are connected to the axle 65 and the shaft 67, and the axes 73 is located somewhat rearwardly of and below the axle 65.

When the saws 25F and 25R are to be raised, hydraulic liquid is forced under pressure into the upper end of the cylinder 70C. This is accomplished by a manually operated pumping unit 75 of conventional construction connected by a hose 76 to the cylinder 70C, and the unit 75 is mounted in the upper part of the enclosure 60 and is operated by means of a rearwardly projecting pivoted handle 75H to pump hydraulic liquid to the cylinder 70C. The unit 75 embodies a check valve means that normally prevents return flow of liquid from the cylinder 70C to the sump of the unit, and when the saws are to be lowered, the check valve means are opened by a release member 75R forming part of the unit 75.

Figure 4:
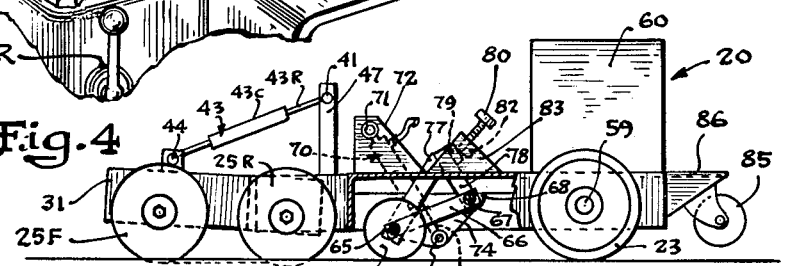
FIG. 4 is a schematic side elevational view of the machine showing the saws in their lower or sawing positions.

When the release member 75R is thus actuated so as to permit return flow of hydraulic liquid from the cylinder 70C, the forward end of the main platform is lowered so the saws 25F and 25R move toward their operating or sawing positions shown in FIG. 4 of the drawings. The depth of cut is however limited by adjustable stop means that are associated with the mounting of the front wheels 22. Such adjustable stop means are provided by a pair of laterally spaced arms 77 pivoted at one end of the axle 65 and having an arm 78 welded or otherwise secured to the remote and rear ends of the bars 77 and extending downwardly and rearwardly, and pivoted on the mounting shaft 67. The arm 78 has a hardened pad or stop member 79 fixed thereto as shown in the drawings, and an adjustable stop screw 80 is provided in the path of movement of the pad 79. The stop screw 80 is mounted above the platform 21 in a cross member 82 that is provided between a pair of upwardly extending support plates 83 that are welded to the platform 21. The stop screw 80 may be adjusted to be engaged by the pad 79 when the desired depth of the saws 25F and 25R has been reached.

Figure 5:
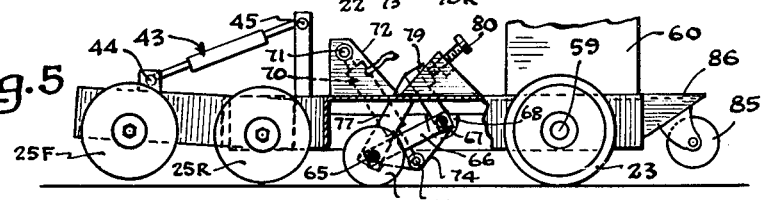
FIG. 5 is a view similar to FIG. 4 and showing the saws elevated to non-operating positions.
Figure 6:
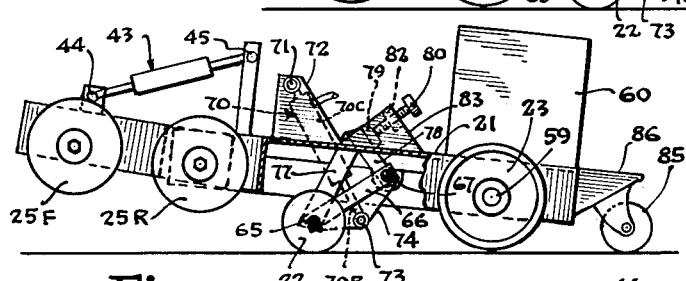
FIG. 6 is a view similar to FIGS. 4 and 5, and showing the machine in a castering relation with the drive wheels rendered ineffective.

The means hereinbefore described for raising and lowering of the saws between the operative and inoperative positions, are, under the present invention, also utilized to disable the driving wheels 23 and place a caster 85 in engagement with the ground so that the unit 20 has a caster-type support provided by the front wheels 22 and the caster 85. The drive wheels 23 are disabled by further lifting of the saws 25F and 25R upwardly beyond the position shown in FIG. 5. Thus, when the hydraulic actuating means 75 are operated to further raise the forward end of the platform 21 beyond the relationship of FIG. 5, and to the relationship shown in FIG. 6, the driving wheels 23 are raised out of contact with the ground and the caster 85 is engaged with the ground. Caster wheel 85 is mounted on a rearwardly projecting bracket 86 that is fixed to the rear end of the platform 25 at the lateral midpoint thereof in the manner illustrated in FIGS. 2, 4, 5, 6 and 7. The caster 85, in the present instance is disposed rearwardly of the rear wheels 23, and thus when the raising movement of the forward end of the platform 21 has been carried to a sufficient extent, the caster 85 is engaged with the ground and the drive wheels 23 are raised to an inoperative relationship wherein they may continue their rotation without imparting manifold 88 as required.

It may be noted that the saws 25R and 25F usually require either cooling by the application of water thereto, or where certain types of saws are used, an abrasive mixture needs to be sprayed onto the saws during operation thereof. For this purpose, each of the saws 25F and 25R has a pair of spray pipes 87 disposed on opposite sides thereof and connected by means of a manifold 88 and hoses 89 to a source of liquid or abrasive mixture. Such source might of course be located on the platform, but due to the volume of liquid required, a supply truck is usually used with means for pumping the liquid to the manifold 88 is required.

Figure 8:
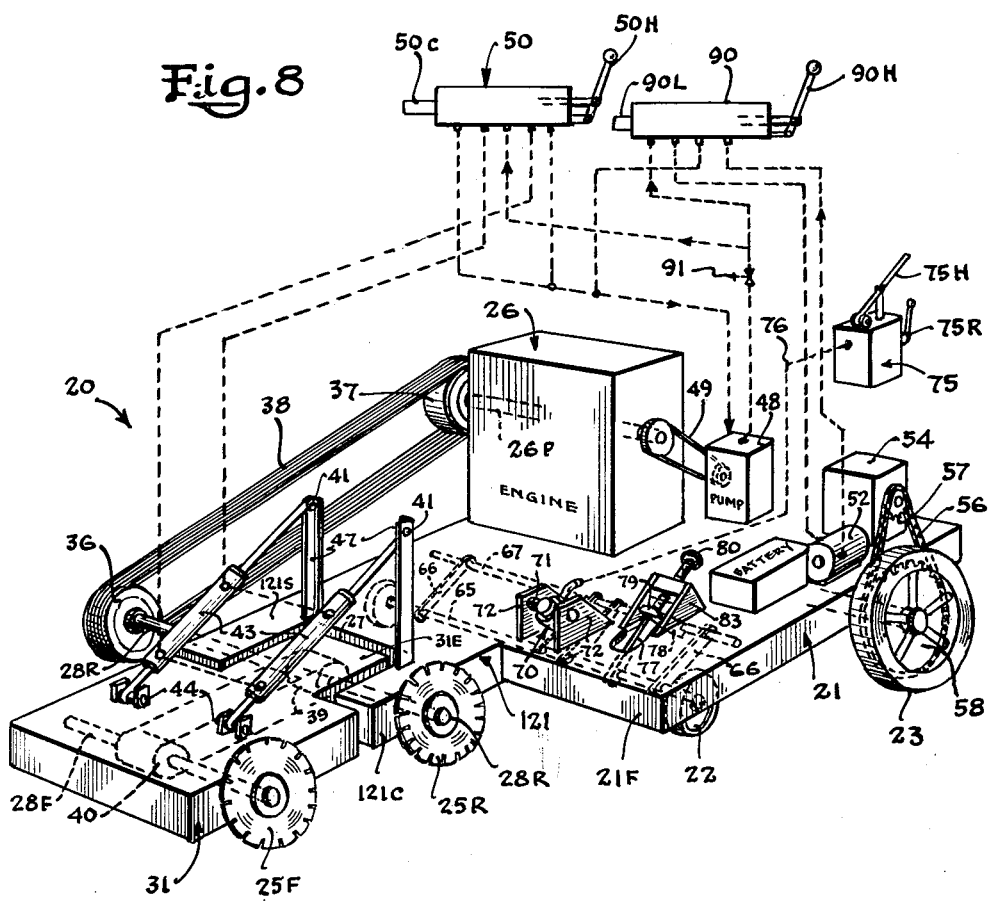
FIG. 8 is a schematic view showing the relationships between the operating and control means of the machine.

The hydraulic controls are located in the upper rear portion of the enclosure 60, and in addition to the valve 50 that controls the operation of the cylinders 43C, there is a valve 90 that controls the flow of hydraulic liquid to the rotative hydraulic motor 52. This valve is of the off-on type, and in the input circuit of the valve 90 and the valve 50, a needle valve 91 is provided as indicated in FIGS. 3 and 8. While the valve controls the rate of flow of hydraulic liquid to the rotary motor 52 and to the cylinders 43C, its primary purpose is to enable the speed of the forward actuation of the mobile unit 20 to be controlled or varied. The valve 90 has a control handle 90H associated therewith, while the valve 50 has a similar control handle 50H associated therewith. The valve 50 is of the spring centered type and has a centering means 50C associated therewith so that the adjusted position of the forward saw 25F may be maintained. The valve 90 however is of the latching type, having latching means 90L associated therewith to latch the valve 90 in its open position wherein the hydraulic motor 52 is operated.

The present mobile sawing unit 20 is of particular advantage and use because a worker who is using the unit 20 walks behind the unit between the two guiding handles or handle bars 62, and may observe the cutting action with particular facility because the two saws 25R and 25F are disposed in a vertical plane that is located at substantially the center line of the mobile unit.

In addition to the foregoing, the speed of forward actuation may be readily and easily controlled by the use of the rate adjusting valve 91, and the cutting action may be stopped and the forward movement of the unit may be quickly terminated merely by actuation of the manually operable hydraulic unit 75 which first raises the saws 25F and 25R from their operative positions, and then renders the drive wheels 23 ineffective. It will be understood of course that the saws continue to rotate, as do the drive wheels 23, but when the unit has been adjusted to the relationship shown in FIG. 6, it may be readily and easily manipulated to align the same with a new sawing path.

The arrangement of the forward saw 25F with respect to the rear saw 25R is of particular advantage because the drive is simple, and is effective in any relative adjustment of the forward saw 25F, and any such adjustment of the saw 25F with respect to the rear saw 25R is maintained while the sawing means are rendered effective or ineffective.

Thus while a preferred embodiment of the invention has been illustrated herein, it is to be understood that changes and variations may be made by those skilled in the art without departing from the spirit and scope of the appending claims.

I claim:

1. In a mobile unit for sawing a kerf in a concrete pavement slab or the like, a main platform having sides and front and rear ends, a driving axle having driving wheels fixed to opposite ends thereof and rotatably associated with said main platform transversely adjacent and parallel to the rear edge of said main platform, a front axle having front wheels at opposite ends thereof, means mounting said front axle parallel to said driving axle and adjacent the front end of the main platform for movement up and down with respect to the main platform to adjust the vertical position of the front end of the main plaform, rigid saw supporting means projecting from the front end of said main platform and having one side edge located near the vertical front to rear center plane of the main platform, a saw arbor rotatably supported by said rigid supporting means parallel to said axles and extending at its opposite ends beyond opposite sides of said supporting means, saw mounting means on the extended end of the saw arbor adjacent said center plane for mounting a circular saw blade thereon, a power source on said main platform connected to the other projecting end of the saw arbor for driving the same, means for raising and lowering said front axle to adjust the vertical locations of the saw arbor, and means operated from said power source for actuating said drive wheels.

2. A mobile unit according to claim 1 in which a caster wheel is mounted on said main platform rearwardly of said rear axle in position to be engaged with the ground while elevating the drive wheels out of contact with the ground when the raising of the front end of said main platform is continued after the saw has been raised to an ineffective position.

3. In a mobile unit for sawing a kerf in a concrete pavement slab or the like, a main platform having sides and front and rear ends, a driving axle having driving wheels fixed to opposite ends thereof and rotatably associated with said main platform transversely adjacent and parallel to the rear edge of said main platform, a front axle having front wheels at opposite ends thereof, means mounting said front axle parallel to said driving axle and adjacent the front end of the main platform for movement up and down with respect to the main platform to adjust the vertical position of the front end of the main platform, a center arm and a side arm located respectively near the center and near one side of the front end of said main platform and extending forwardly from said front edge in rigid relation to the main platform and defining a mounting space between the arms, a main saw arbor rotatably supported by said arms parallel to said axles and extending at its opposite ends beyond the side and center arms, saw mounting means on the end of the saw arbor that is extended beyond said center arm for mounting a circular saw blade thereon near the vertical front to rear center plane of said main platform, a secondary platform having a width approximately one-half the width of the main platform and having a rear portion thereof extended rearwardly into the space between said arms, means pivoting said rear portion of said secondary platform on said main saw arbor, a secondary saw arbor rotatably mounted on said secondary platform parallel to said main saw arbor and having one end of said secondary arbor extended beyond one side of said secondary platform to a position corresponding to the position of said one end of said main saw arbor, means on the projecting end of said secondary arbor for mounting a circular saw thereon, drive transmitting means connecting said arbors for driving the secondary arbor from the main arbor in any position of adjustment of said secondary platform with respect to the main platform, a power source on said main platform connected to the other projecting end of the main saw arbor for driving the same, means for raising and lowering said front axle to adjust the vertical locations of the two saw arbors in unison, and means operated from said power source for actuating said drive wheels.

4. A mobile unit according to claim 3 in which a caster wheel is mounted on said main platform rearwardly of said rear axle in position to be engaged with the ground while elevating the drive wheels out of contact with the ground when the raising of the front end of said main platform is continued after the saws have been raised to ineffective positions.

5. In a mobile unit for sawing a kerf in a concrete pavement slab or the like, a main platform having sides and front and rear ends, said platform having a rigid extension from its forward end, said extension having a width approximately one-half of the width of said main platform and said extension being located so that one side thereof is located adjacent the vertical front to rear center plane of the platform saw-supporting means on said extension rotatably mounting a main disc saw in substantially the vertical center plane of the platform, a driving axle having driving wheels fixed to opposite ends thereof and rotatably associated transversely with said main platform adjacent and parallel to the rear edge of said main platform, a front axle having front wheels at opposite ends thereof, means mounting said front axle parallel to said driving axle and adjacent the front end of the main platform for movement up and down with respect to the main platform to adjust the vertical position of the front end of the main platform, a secondary platform having a width approximately one-half the width of the main platform and having a rear portion thereof pivoted on said extension of the main platform on the axis of said saw, a secondary saw rotatably mounted on said secondary platform parallel to said axis, drive transmitting means connecting said saws for driving the secondary saw from the main saw in any position of adjustment of said secondary platform with respect to the main platform, a power source on said main platform connected to the main saw for driving the same, means for pivotally adjusting said secondary platform relative to said main platform, means for raising and lowering said front axle to adjust the vertical location of the saws in unison, and means operated from said power source for actuating said drive wheels.

References Cited in the file of this patent
UNITED STATES PATENTS

| | | |
|---|---|---|
| 2,673,725 | Coates | Mar. 30, 1954 |
| 2,934,327 | Lewis | Apr. 26, 1960 |
| 2,939,691 | Lewis | June 7, 1960 |
| 2,990,660 | Hatcher | July 4, 1961 |
| 3,007,687 | Hatcher | Nov. 7, 1961 |

UNITED STATES PATENT OFFICE
CERTIFICATE OF CORRECTION

Patent No. 3,141,702                                July 21, 1964

Amos B. Barton

It is hereby certified that error appears in the above numbered patent requiring correction and that the said Letters Patent should read as corrected below.

Column 5, line 7, for "manifold 88 as required" read -- movement to the unit 20 --; same column 5, line 19, for "is" read -- as --.

Signed and sealed this 24th day of November 1964.

(SEAL)
Attest:

ERNEST W. SWIDER
Attesting Officer

EDWARD J. BRENNER
Commissioner of Patents